(12) United States Patent
Worfolk et al.

(10) Patent No.: US 9,690,438 B2
(45) Date of Patent: *Jun. 27, 2017

(54) SYSTEM AND METHOD FOR DETERMINING INPUT OBJECT INFORMATION FROM PROXIMITY AND FORCE MEASUREMENTS

(71) Applicant: Synaptics Incorporated, San Jose, CA (US)

(72) Inventors: Patrick Worfolk, San Jose, CA (US); Vijay Venkatesh Mahalingam, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,080

(22) Filed: May 6, 2016

(65) Prior Publication Data

US 2016/0253007 A1    Sep. 1, 2016

Related U.S. Application Data

(63) Continuation of application No. 14/320,005, filed on Jun. 30, 2014.

(51) Int. Cl.
*G06F 3/045* (2006.01)
*G06F 3/044* (2006.01)
(Continued)

(52) U.S. Cl.
CPC .......... *G06F 3/044* (2013.01); *G06F 3/03545* (2013.01); *G06F 3/0414* (2013.01);
(Continued)

(58) Field of Classification Search
CPC ....................................................... G06F 3/044
(Continued)

(56) References Cited

U.S. PATENT DOCUMENTS 5,510,613 A    4/1996  Reilly et al.
5,825,352 A *  10/1998  Bisset .................... G06F 3/044
                                                                        345/157
(Continued)

OTHER PUBLICATIONS

International Preliminary Report on Patentability in related International Application No. PCT/US2015/037202 dated Jan. 12, 2017 (12 pages).

*Primary Examiner* — Jason Olson
(74) *Attorney, Agent, or Firm* — Osha Liang LLP

(57) ABSTRACT

A processing system for an input device having a sensing region overlapping an input surface and an array of sensor electrodes configured to form a plurality of proximity pixels and a plurality of force pixels. The processing system is configured to: determine a proximity image indicative of positional information for input objects; determine a force image indicative of local deflection of the input surface in response to force applied by the input objects; determine a respective group of proximity pixels from the proximity image corresponding to each input object; determine a respective group of force pixels from the force image corresponding to each determined group of proximity pixels; determine the position of each input object based on the determined groups of proximity pixels; and determine the force associated with each input object based on the determined groups of force pixels.

22 Claims, 8 Drawing Sheets

(51) Int. Cl.
*G06F 3/0354* (2013.01)
*G06F 3/041* (2006.01)

(52) U.S. Cl.
CPC .. *G06F 3/0416* (2013.01); *G06F 2203/04101* (2013.01); *G06F 2203/04104* (2013.01); *G06F 2203/04105* (2013.01); *G06F 2203/04106* (2013.01)

(58) Field of Classification Search
USPC .......................................................... 345/174
See application file for complete search history.

(56) References Cited

U.S. PATENT DOCUMENTS

| | | | |
|---|---|---|---|
| 5,942,733 | A | 8/1999 | Allen et al. |
| 6,002,389 | A | 12/1999 | Kasser |
| 7,154,481 | B2 | 12/2006 | Cross et al. |
| 7,395,717 | B2 | 7/2008 | DeAngelis et al. |
| 7,538,760 | B2 | 5/2009 | Hotelling et al. |
| 7,825,911 | B2 | 11/2010 | Sano et al. |
| 8,063,886 | B2 | 11/2011 | Serban et al. |
| 8,607,651 | B2 | 12/2013 | Eventoff |
| 8,627,716 | B2 | 1/2014 | Son |
| 8,823,664 | B2 * | 9/2014 | Kyrynyuk ............... G06F 3/044 178/18.01 |
| 2001/0013855 | A1 | 8/2001 | Fricker et al. |
| 2004/0090429 | A1 | 5/2004 | Geaghan et al. |
| 2006/0260417 | A1 | 11/2006 | Son et al. |
| 2007/0229464 | A1 | 10/2007 | Hotelling et al. |
| 2007/0236466 | A1 | 10/2007 | Hotelling |
| 2008/0174321 | A1 | 7/2008 | Kang et al. |
| 2008/0309629 | A1 * | 12/2008 | Westerman ............ G06F 3/038 345/173 |
| 2009/0091551 | A1 | 4/2009 | Hotelling et al. |
| 2009/0267916 | A1 | 10/2009 | Hotelling |
| 2009/0309616 | A1 * | 12/2009 | Klinghult ................ G06F 3/044 324/686 |
| 2009/0314621 | A1 | 12/2009 | Hotelling |
| 2010/0242629 | A1 | 9/2010 | Leuenberger et al. |
| 2010/0253651 | A1 | 10/2010 | Day |
| 2010/0282000 | A1 | 11/2010 | Gorjanc et al. |
| 2012/0013573 | A1 | 1/2012 | Liu et al. |
| 2012/0026124 | A1 | 2/2012 | Li et al. |
| 2012/0038583 | A1 | 2/2012 | Westhues et al. |
| 2012/0062245 | A1 | 3/2012 | Bao et al. |
| 2012/0105358 | A1 | 5/2012 | Momeyer et al. |
| 2012/0105367 | A1 | 5/2012 | Son et al. |
| 2012/0206401 | A1 | 8/2012 | Lin et al. |
| 2012/0299866 | A1 | 11/2012 | Pao et al. |
| 2013/0018489 | A1 | 1/2013 | Grunthaner et al. |
| 2013/0021089 | A1 | 1/2013 | Sakurai et al. |
| 2013/0047747 | A1 | 2/2013 | Joung |
| 2014/0022201 | A1 | 1/2014 | Boychuk et al. |
| 2014/0306927 | A1 * | 10/2014 | Kashiwagi ............ G06F 3/0414 345/174 |
| 2015/0193068 | A1 * | 7/2015 | Kim ..................... G06F 3/0416 345/174 |
| 2015/0370356 | A1 * | 12/2015 | Hwang .................. G06F 3/041 345/173 |

* cited by examiner

SYSTEM AND METHOD FOR DETERMINING INPUT OBJECT INFORMATION FROM PROXIMITY AND FORCE MEASUREMENTS

CROSS-REFERENCE TO RELATED APPLICATION

The present application is a continuation application of and, thereby, claims benefit under 35 U.S.C. §120 to U.S. application Ser. No. 14/320,005, entitled, "SYSTEM AND METHOD FOR DETERMINING INPUT OBJECT INFORMATION FROM PROXIMITY AND FORCE MEASUREMENTS," filed on Jun. 30, 2014, and incorporated herein by reference.

FIELD OF THE INVENTION

This invention generally relates to electronic devices, and more specifically relates to sensor devices and using sensor devices for producing user interface inputs.

BACKGROUND OF THE INVENTION

Proximity sensor devices (also commonly called touch sensor devices) are widely used in a variety of electronic systems. A proximity sensor device typically includes a sensing region, often demarked by a surface, in which input objects may be detected. Example input objects include fingers, styli, and the like. The proximity sensor device may utilize one or more sensors based on capacitive, resistive, inductive, optical, acoustic and/or other technology. Further, the proximity sensor device may determine the presence, location and/or motion of a single input object in the sensing region, or of multiple input objects simultaneously in the sensor region.

The proximity sensor device may be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device may be integral or peripheral to the computing system with which it interacts.

Presently known sensor devices have the ability to detect both the position and force associated with objects in the sensing region. However, reliably determining the amount of force applied by multiple objects, respectively, is a continuing challenge. This limits the flexibility of the proximity sensor device in providing different types of user interface actions in response to different numbers of objects or gestures with different numbers of objects.

Thus, improved techniques are needed for reliably determining the respective force applied by multiple objects in a sensing region of a proximity sensor device. Other desirable features and characteristics will become apparent from the subsequent detailed description and the appended claims, taken in conjunction with the accompanying drawings and the foregoing technical field and background.

BRIEF SUMMARY OF THE INVENTION

Devices and methods are provided for facilitating improved sensor device usability by determining the respective force applied by each of a plurality of input objects in a sensing region of a capacitive sensor. In particular, various embodiments determine a proximity (touch) image and a force image associated with one or more input objects. The pixels which make up the touch image may then be segmented into individual touch "blobs", each comprising a list of touch pixels corresponding to a unique input object. Touch image segmentation typically involves a pixel-by-pixel approach using, for example, a watershed or analogous algorithm. If the touch image is segmented correctly, each touch blob will reliably correspond to a unique input object (e.g., finger).

The force image is then segmented into individual force blobs, each comprising a subset of the pixels which make up the force image. If the force image is segmented correctly, each force blob will also reliably correspond to a unique input object. To help ensure that force image segmentation proceeds in a manner consistent with the previously performed touch image segmentation, the touch blobs are used in segmenting the force image. That is, the pixels associated with each touch blob are used to define an initial force blob. The initial force blobs are then processed using any suitable image segmentation technique. In an embodiment, the force pixels may be aligned exactly with the touch pixels in a one-to-one correspondence, simplifying the force image segmentation process. Alternatively, the force pixels and touch pixels may be configured in a greater than or less than one-to-one correspondence.

The force blobs may then be used to reliably determine the amount of force associated with each input object, thereby improving sensor device usability.

BRIEF DESCRIPTION OF THE DRAWINGS

The preferred exemplary embodiment of the present invention will hereinafter be described in conjunction with the appended drawings, where like designations denote like elements, and wherein.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The embodiments of the present invention provide a device and method that facilitates improved sensor device usability. Specifically, the device and method provide improved device usability by facilitating the reliable determination of the amount of force per input object for one or more objects in a sensing region of a capacitive sensor device. In various embodiments, the results of a touch image segmentation algorithm are used to seed a subsequent force image segmentation algorithm, to thereby reliably correlate the segmented force image to the respective individual input objects determined during touch image segmentation.

Figure 1:
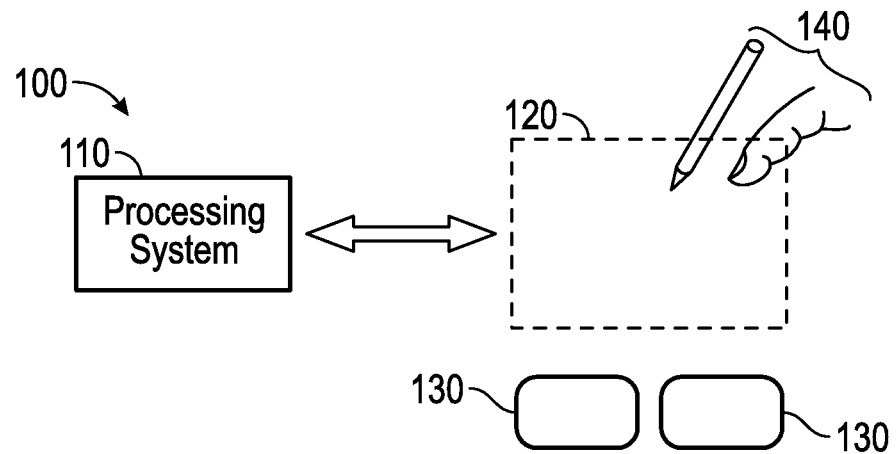
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processing system of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processing systems (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
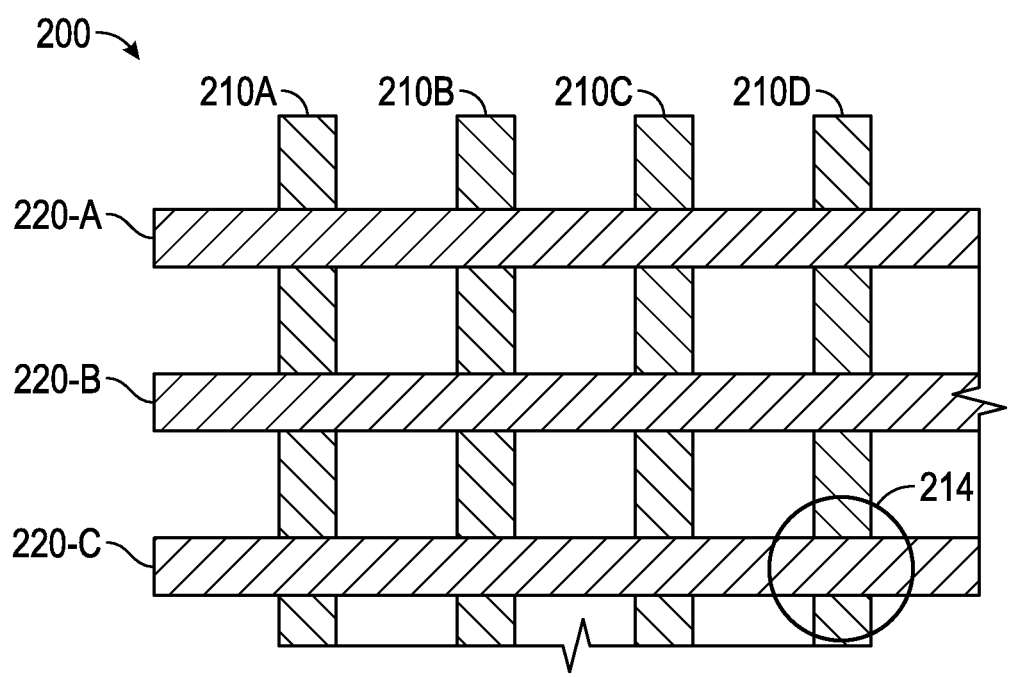
FIG. 2 is a schematic view of an exemplary electrode array illustrating touch sensor and/or force sensor pixels in accordance with an embodiment of the invention.

FIG. 2 shows a portion of a sensor electrode pattern configured to sense the position (or force) associated with objects proximate the pattern, according to some embodiments. For clarity of illustration and description, FIG. 2 shows a pattern (e.g., an array) 200 comprising a plurality of transmitter electrodes 220A-C and a plurality of receiver electrodes 210A-D defining an array of pixels 214. In the context of proximity sensing, the receiver electrodes 210 and transmitter electrodes 220 function as touch sensor electrodes, which measure a change in capacitance of the array of pixels 214, producing a touch image indicative of input objects present in the sensing region. In the context of force sensing, the receiver electrodes 210 and transmitter electrodes 220 function as force sensor electrodes, which measure a change in capacitance of the array of pixels 214, producing a force image indicative of input objects applying a force to the sensor electrodes.

Transmitter electrodes 220 and receiver electrodes 210 are typically ohmically isolated from each other. That is, one or more insulators separate the transmitter electrodes from the receiver electrodes and prevent them from electrically shorting to each other. In some embodiments, receiver electrodes 210 and transmitter electrodes 220 are separated by insulative material disposed between them at cross-over areas; in such constructions, the electrode junctions (or pixels) may be formed with jumpers connecting different portions of the same electrode. In some embodiments, the transmitter and receiver electrodes are separated by one or more layers of insulative material. In some other embodiments, the transmitter and receiver electrodes are separated by one or more substrates; for example, they may be disposed on opposite sides of the same substrate, or on different substrates that are laminated together. Moreover, one or more of the sensor electrodes can be used for both capacitive sensing and for updating the display. Alternatively, the sensor electrodes may be implemented in a single layer design where the sensor electrodes do not overlap in the sensing region. In some embodiment, the transmitter and receiver electrodes may be separated by a compressible and/or deformable insulating material. In some embodiments, the transmitter and receiver electrodes may be separated by a uniform or individually spaced layer of force sensing resistors (FSR) or a piezoelectric material.

A capacitive image and a force image may be determined from measurements received with the receiver electrodes. As noted above, the embodiments of the invention can be implemented with a variety of different types and arrangements of capacitive sensor electrodes or a variety of different non-capacitive proximity and touch sensing devices. For example, the electrodes for sensing may be disposed in a first direction (e.g., the "X" direction), a second direction (e.g., the "Y" direction), or in any suitable orthogonal, parallel, or hybrid configuration such as polar coordinates (e.g., "r" and "0"). In these embodiments the sensor electrodes themselves are commonly arranged in a circle or other looped shape to provide "0", with the shapes of individual sensor electrodes used to provide "r". In other embodiments, the sensor electrodes may be formed on the same layer, or the input device can be implemented with electrode arrays that are formed on multiple substrate layers.

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Again, it should be emphasized that the sensing electrodes 200 are just one example of the type of electrodes that may be used to implement the embodiments of the invention. For example, some embodiments may include more or less numbers of electrodes. In other examples, the electrodes may be formed on multiple layers. In yet other examples, the electrodes may be implemented with an array of electrodes that have multiple rows and columns of discrete electrodes.

Figure 3:
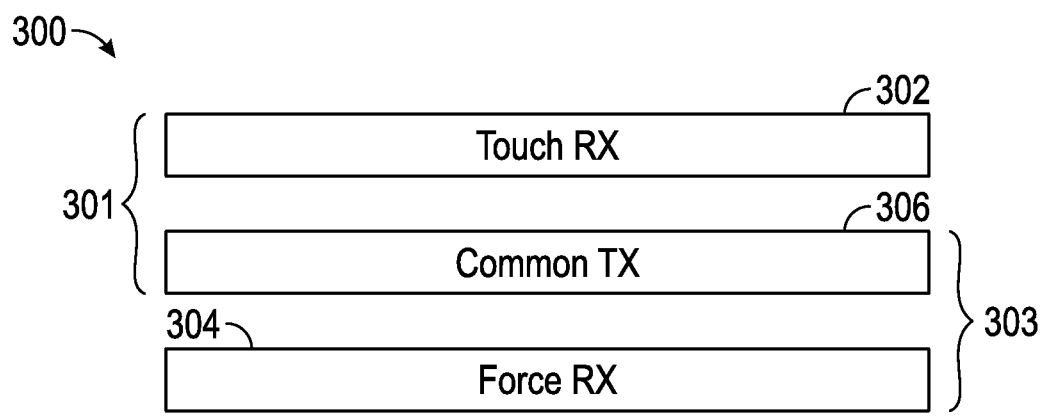
FIG. 3 is a schematic side elevation view of a conceptual layout for a combination touch and force sensor stack-up including touch sensor electrodes and force sensor electrodes in accordance with an embodiment of the invention.

FIG. 3 is a conceptual layout for a touch and force sensor stack-up 300 including a touch sensor assembly 301 and a force sensor assembly 303, where the touch and force sensor assemblies share a common transmitter electrode layer 306. Alternatively, the touch and force assemblies may each include dedicated transmitter electrodes. In the illustrated embodiment, the touch sensor assembly 301 includes a touch sensor electrode layer 302 which cooperates with the transmitter electrode layer 306 to produce a touch image. Similarly, the force sensor assembly 303 includes a force sensor electrode layer 304 which cooperates with the transmitter electrode layer 306 to produce a force image. Those skilled in the art will appreciate that various manufacturing and performance efficiencies and advantages may be realized by sharing and strategically arranging the various electrode layers and associated substrate layers. For purposes of the present discussion, the sensor stack-up 300 may be configured in any desired manner to produce a discretized (e.g., pixelated) touch image and a corresponding discretized force image. Thus, as described above, any non-capacitive sensing technique which produces a discretized force and/or touch image may utilize the techniques described herein to determine the position and force applied by input objects Turning now to FIGS. 4 and 5, exemplary input objects in a sensing region are illustrated. In the illustrated embodiments, the input objects are fingers; alternatively, and as discussed below in connection with the force image segmentation process, the input object(s) may comprise conductive objects (including hand parts such as fingers, thumb, and/or palm), non-conductive objects such as a fingernail, stylus, or pen, or a combination of conductive and non-conductive objects.

Figure 4:
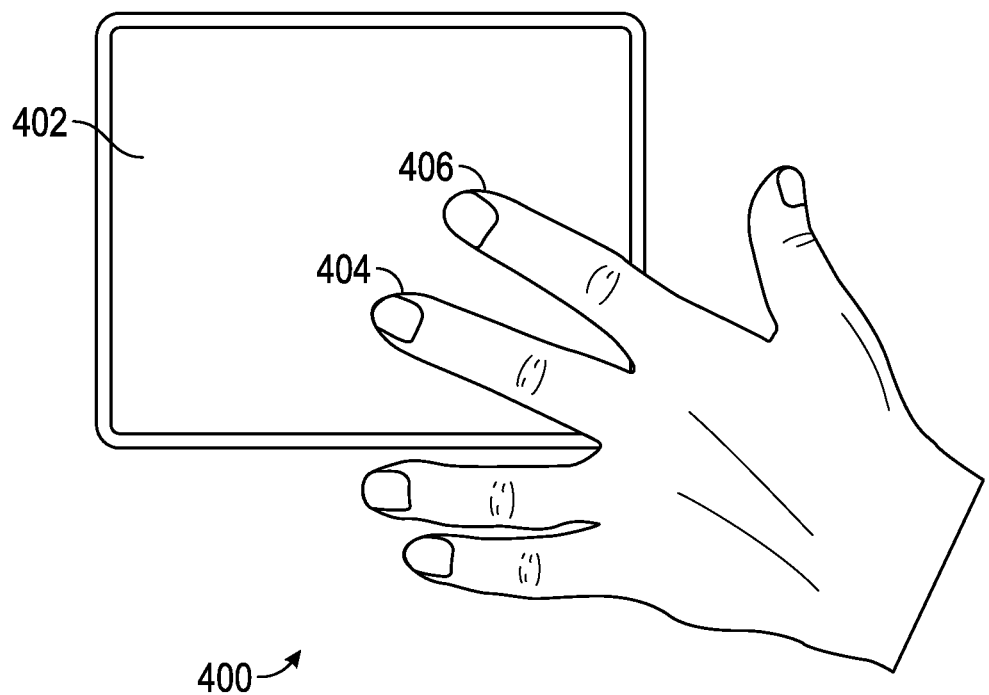
FIG. 4 is a top view of an input device with multiple input objects in the sensing region in accordance with an embodiment of the invention.
Figure 5:
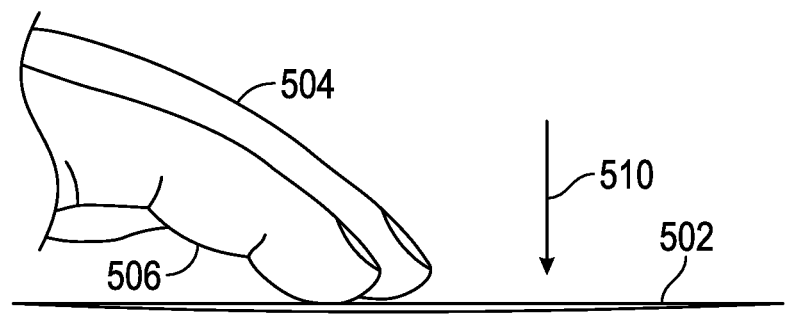
FIG. 5 is a side view of the input device of FIG. 4 showing the direction of applied force by one or more input objects upon an input surface of the sensing region in accordance with an embodiment of the invention.

More particularly, FIGS. 4 and 5 show top and side views, respectively, of an exemplary input device having two fingers interacting with the sensing region. Specifically, FIG. 4 is a top view of an input device 400 with respective input objects 404, 406 proximate an input surface 402 of a sensing region. FIG. 5 is a side view of an input device 500 showing one or more input objects 504, 506 applying force along a direction 510 to an input surface 502. As described below in greater detail, the touch sensor assembly produces a touch image of the input objects, and the force sensor assembly produces a corresponding force image (also referred to as a pressure image) of the input objects. In accordance with various embodiments, information obtained from segmenting the touch image may be used to optimize (or otherwise facilitate) segmentation of the force image. Specifically, the touch image may be segmented into mutually exclusive touch blobs, and these touch blobs may be used to seed initial force blob formation, thereby ensuring reliable correlation between the resulting force blobs and the respective input objects which produced them.

Figure 6:
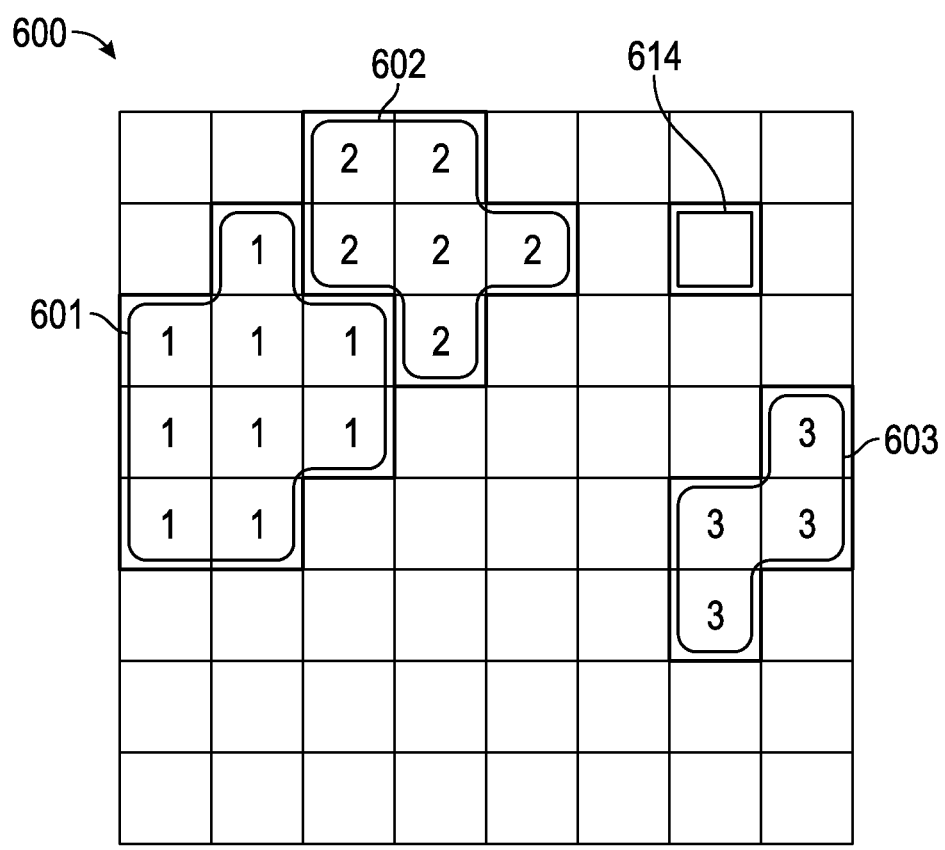
FIG. 6 is a schematic top view an input device graphically illustrating touch image information and associated segmented touch blobs for multiple objects in the sensing region in accordance with an embodiment of the invention.
Figure 7:
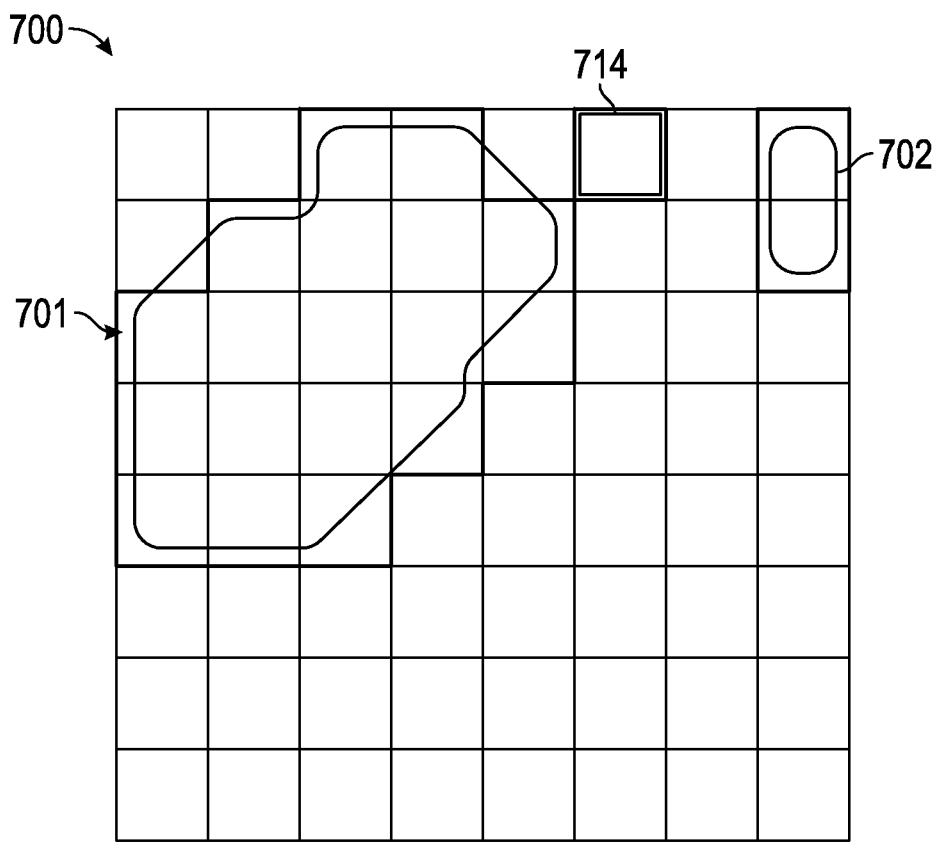
FIG. 7 is a schematic top view of an input device illustrating force image information for the input objects shown of FIG. 6 in accordance with an embodiment of the invention.

Turning now to FIGS. 6 and 7, exemplary touch and force images are illustrated for multiple input objects. More particularly, FIG. 6 depicts an array 600 of individual touch pixels 614 illustrating touch image information for multiple input objects. Specifically, the touch image includes a first group of pixels identified by the number "1", a second group of pixels identified by the number "2", and a third group of pixels identifies by the number "3". Those skilled in the art will appreciate that robust algorithms have been developed for segmenting the pixels comprising a touch image into individual touch blobs, each comprising a unique subset of the touch image pixels. For present purposes, any one or combination of presently known or heretofore developed techniques for touch segmentation may be employed in conjunction with the embodiments discussed herein.

With continued reference to FIG. 6, the touch image may be segmented into a first touch blob 601, a second touch blob 602, and a third touch blob 603, corresponding to respective first, second, and third input objects. More particularly, the first touch blob 601 includes those touch pixels—and only those touch pixels—denominated by the number "1"; touch blob 602 includes those pixels denominated by the number "2"; and touch blob 603 includes those pixels denominated by the number "3". Thus, the touch segmentation process assigns a unique subset of the touch image pixels to a respective touch blob, with each touch blob corresponding to a unique input object. Having determined which touch pixels correspond to each input object, it remains to determine the aggregate force applied by each input object. Importantly, though not shown in FIG. 6, the unique subsets of pixels corresponding to each input object may share at least part of one pixel or a whole pixel.

The force segmentation process assigns a unique subset of the force image pixels to respective force blobs, with each force blob representing a unique input object. In accordance with various embodiments, by using the determined touch blobs to seed the formation of force basins (or other computational construct) used to determine force blobs, the relationship between individual input objects and their associated force information may be reliably determined.

More particularly, FIG. 7 is a top view of an array 700 of individual force pixels 714 representing a force image of multiple input objects. Specifically, the force image includes a first group 701 of force pixels and a second group 702 of force pixels. As discussed in greater detail below, each force pixel has an associated force value. Upon completion of the force image segmentation process, the force values of all pixels within each force blob may be summed or otherwise combined to determine the applied force attributable to each input object.

With continued reference to FIG. 7, while each force pixel above a certain threshold value bears some relationship to at least one input object, the precise relationship between each input object and each force pixel may not be immediately apparent from the force image alone. Such ambiguity may be due to system noise, clumping of fingers together, and various motion and other artifacts. Accordingly, it is desirable to segment the force image into one or more force blobs, with each force blob corresponding to a unique input object in a manner analogous to segmenting the touch image into touch blobs. However, independently segmenting the force image without reference to the segmented touch image may result in ambiguities, particularly with regard to pixels near clumped fingers which could arguably be allocated on one finger or the other. As explained more fully below, seeding the formation of force blobs with touch blob pixels mitigates such ambiguity. In this regard, although each resulting segmented force blob may include more than, less than, or the same pixels as a previously determined touch blob, it is nonetheless desirable to use the touch blobs to seed the force segmentation process. In this way, the correlation between a particular input object and its associated touch pixels, on the one hand, and the force pixels associated with that same input object, on the other hand, may be preserved.

Figure 8:
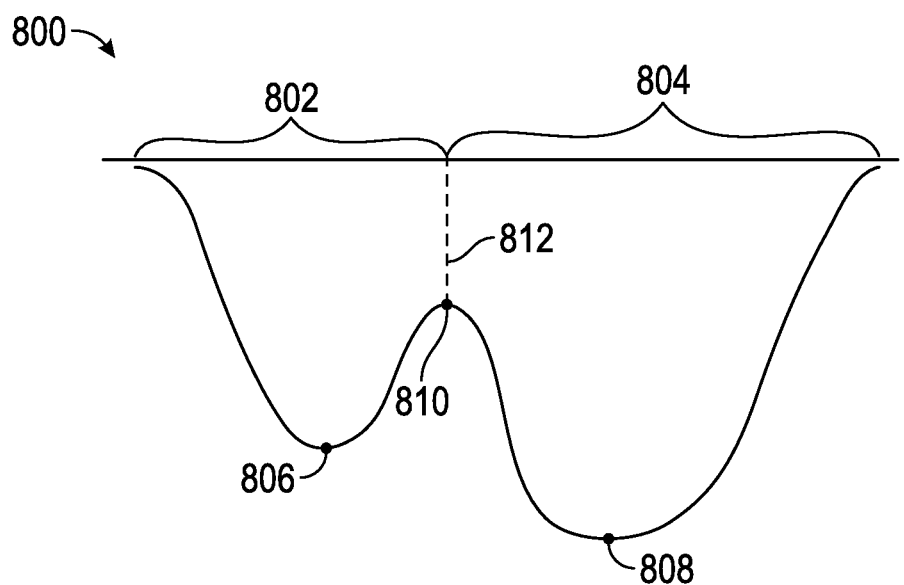
FIG. 8 is a two-dimensional graphic representation of exemplary touch basins illustrating a touch segmentation algorithm in accordance with an embodiment of the invention.

Referring now to FIGS. 6 and 8, touch image segmentation will now be briefly described in greater detail as a predicate to the ensuing discussion regarding the use of touch blobs to seed force basins during the initial formation of force blobs.

FIG. 8 is a two-dimensional graph 800 of exemplary touch basins 802 and 804 illustrating a touch segmentation process. In the present context, a basin (or "catchment basin") is a graphical construct used to aid visualization of an image segmentation process whereby the "depth" of the basin represents the magnitude of the change in capacitance measured by the sensor electrodes. A typical segmentation process employs a computer implemented algorithm to identify those pixels in a touch image (such as the touch image shown in FIG. 6) having a variable capacitance above a threshold value, and assign each such pixel to one or more (e.g., when a pixel borders two unique neighboring input objects) input objects.

With continued reference to FIG. 8, those skilled in the art will appreciate that a typical touch image segmentation algorithm identifies local minima 806 and 808, and assigns the lowest local minimum (e.g., local minimum 808) to a first basin (e.g. basin 804). Thereafter, the then currently lowest value pixels are recursively evaluated in a "rising water level" process. If the then current pixel under inspection is adjacent to a previously assigned pixel, it is assigned to the same touch basin as the previously assigned pixel; otherwise, the then current pixel is assigned to a new basin. When a pixel such as pixel 810 is encountered which is adjacent to two different previously assigned pixels, the algorithm uses predetermined metrics (such as the relative depths of the two basins) to allocate the then current pixel, to either basin or to both basins. Based on well-known metrics, the two basins may be merged into a single basin; alternatively, a dam 812 may be constructed to preserve the two basins during subsequent segmentation processing. In some embodiments, a dam may be formed "between" adjacent pixels, in other embodiments, a dam may be formed "through" a pixel, wherein the latter involves assigning the pixel to more than one basin. The basins are thus grown until all pixels above a threshold value have been assigned to at least one basin. Each fully segmented touch basin is then declared a touch blob.

Once the touch image is segmented, the force image may then be segmented into force blobs. As discussed above, it is desirable to start the force segmentation process by seeding each force basin with a respective group of touch blob pixels.

Figure 9:
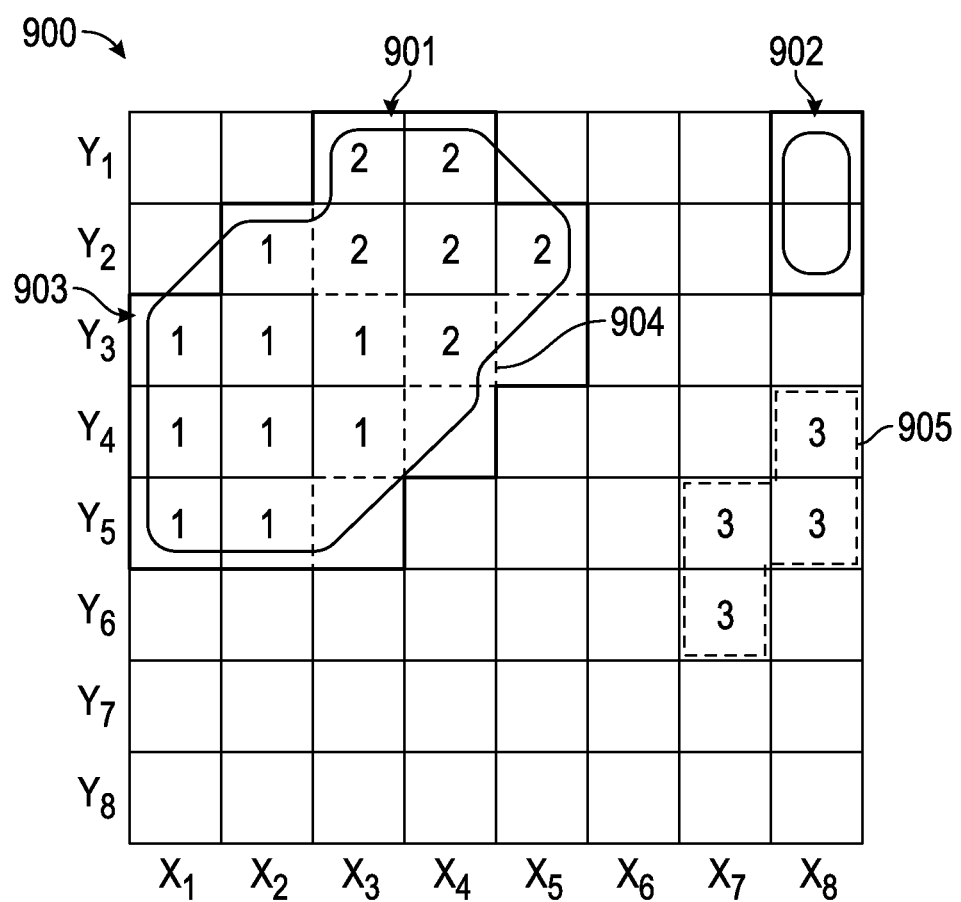
FIG. 9 is a schematic top view of an input device illustrating force image information superimposed on touch blobs illustrating initial seeding of touch blob information into initial force basins for the input objects shown of FIGS. 6 and 7 in accordance with an embodiment of the invention.

FIG. 9 illustrates an array of force sensor pixels showing the seeding of touch blob information into initial force basin formation. For clarity, the touch pixels and force pixels are aligned on a one-to-one basis, although the force pixilation may alternatively be greater than or less than the touch pixilation.

More particularly, FIG. 9 depicts a pixelated sensor array 900 defined by X coordinates $x_1$-$x_8$ and Y coordinates $y_1$-$y_8$. In the illustrated example, the touch segmentation process determined three distinct touch blobs: i) a first touch blob including a first subset of pixels {($x_2$, $y_2$), ($x_1$, $y_3$), ($x_2$, $y_3$), ($x_3$, $y_3$), ($x_1$, $y_4$), ($x_2$, $y_4$), ($x_3$, $y_4$), ($x_1$, $y_5$), ($x_2$, $y_5$)}; ii) a second touch blob including a second subset of pixels {($x_3$, $y_1$), ($x_4$, $y_1$), ($x_5$, $y_1$), ($x_3$, $y_2$), ($x_4$, $y_2$), ($x_5$, $y_2$), ($x_4$, $y_3$)}; and iii)) a third touch blob including a third subset of pixels {($x_8$, $y_4$), ($x_7$, $y_5$), ($x_8$, $y_5$), ($x_7$, $y_6$)}.

With continued reference to FIG. 9, regions 901 and 902 are adjacent/neighboring force pixels which have a value above a threshold. In various embodiments, force image segmentation begins with: i) seeding a first force basin 903 with the pixels from the first touch blob; ii) seeding a second force basin 904 with the pixels from the second touch blob; and iii) seeding a third force basin 905 with the pixels from the third touch blob. As discussed in greater detail below, the third force basin is filtered out inasmuch as the pixels within the third force basin do not comprise any force pixels above a threshold.

Figure 10:
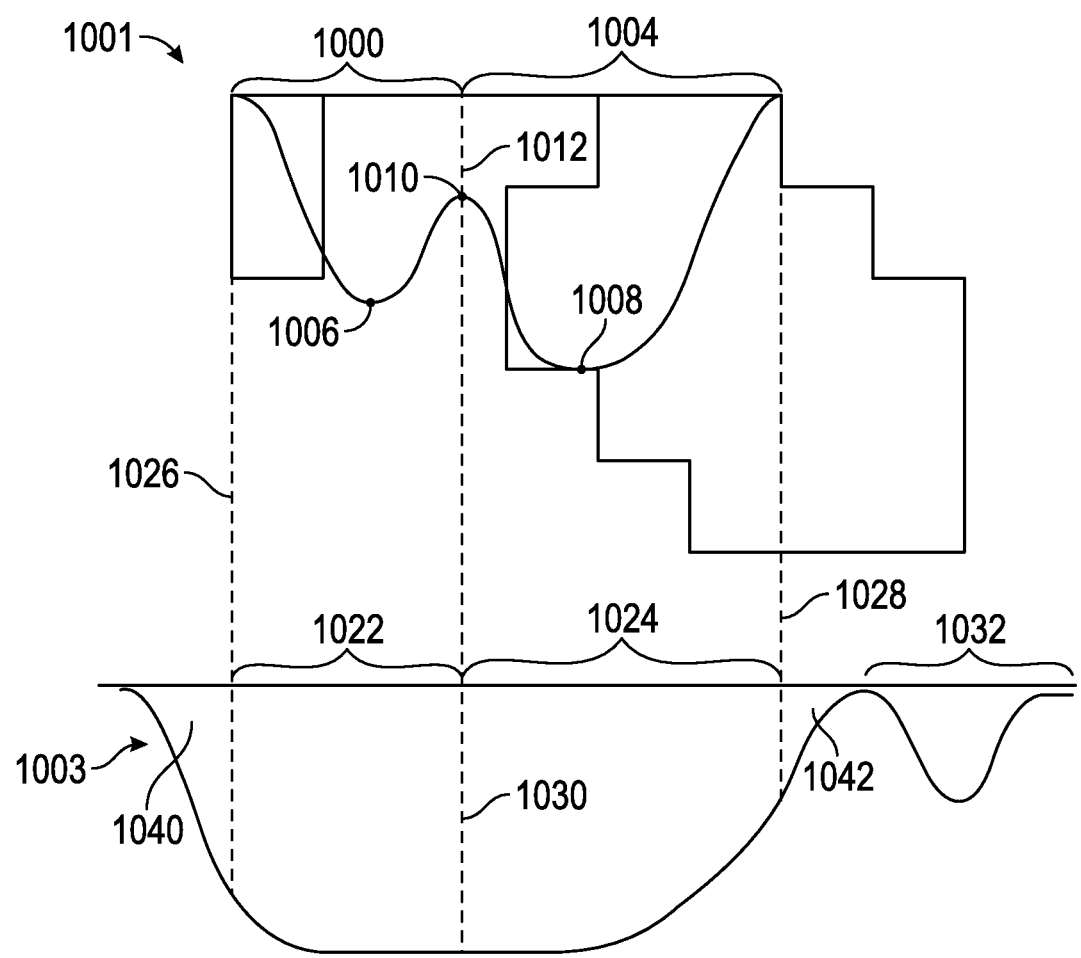
FIG. 10 is a two-dimensional graphic representation of touch blobs seeding force basins in the context of an exemplary force image segmentation algorithm in accordance with an embodiment of the invention.

FIG. 10 illustrates a cross-sectional view of a touch and force image, for the purposes of segmentation. A touch image cross section 1001 includes a first touch blob 1002 and a second touch blob 1004 separated by a dam 1012, and a force image cross section 1003 includes a first force basin 1002 and a second force basin 1004 separated by a dam 1030, as well as a third force basin 1032. Force image segmentation begins by seeding the first force basin 1022 with the pixels from the first touch blob 1002 and seeding the second force basin 1024 with the pixels from the second touch blob 1004. Thus, the first region 901 (FIG. 9) is initially segmented into the first and second force basins 1022 and 1024, subject to further force image segmentation processing as discussed below. Additionally, because there is no touch blob corresponding to the second force image region 902, the force basin associated with region 902 is not initially seeded; rather, it is grown organically in accordance with the force segmentation algorithm as also described below.

With continued reference to FIG. 10, after initial seeding of the first force basin 1022 with the pixels from first touch blob 1002, the force segmentation algorithm proceeds to evaluate each force image pixel to determine if it should remain within the assigned force basin. That is, if the then current force image pixel under inspection is adjacent to a previously assigned force pixel, it is assigned to the same force basin; otherwise, a new force basin is begun. This is depicted graphically as force basin 1032 which corresponds to the force image region 902. To the extent a force basin includes pixels in addition to those initially seeded from a touch blob, the force basin is grown accordingly as shown by the force basin region 1040 (corresponding to pixel ($x_3$, $y_5$)) and force basin region 1042 (corresponding to pixel ($x_5$, $y_3$)). For those force image pixels (such as pixel ($x_4$, $y_4$)) which are not assigned to a touch blob, the force segmentation may allocate the pixel to a force basin based on suitable image segmentation metrics, as in connection with the touch segmentation metrics for resolving ambiguity, for example assigning the pixel to both force basins, or assigning a part of the pixel to each force basin.

In the interest of completeness, a third force basin (not shown) may also be initially seeded with pixels {($x_8$, $y_4$), ($x_7$, $y_5$), ($x_8$, $y_5$), ($x_7$, $y_6$)} from the third touch blob (FIG. 9), but during subsequent force segmentation processing this third force basin is reduced to the null set because the force image does not contain any force pixels above a threshold which correspond to the touch blob for those pixels.

Figure 11:
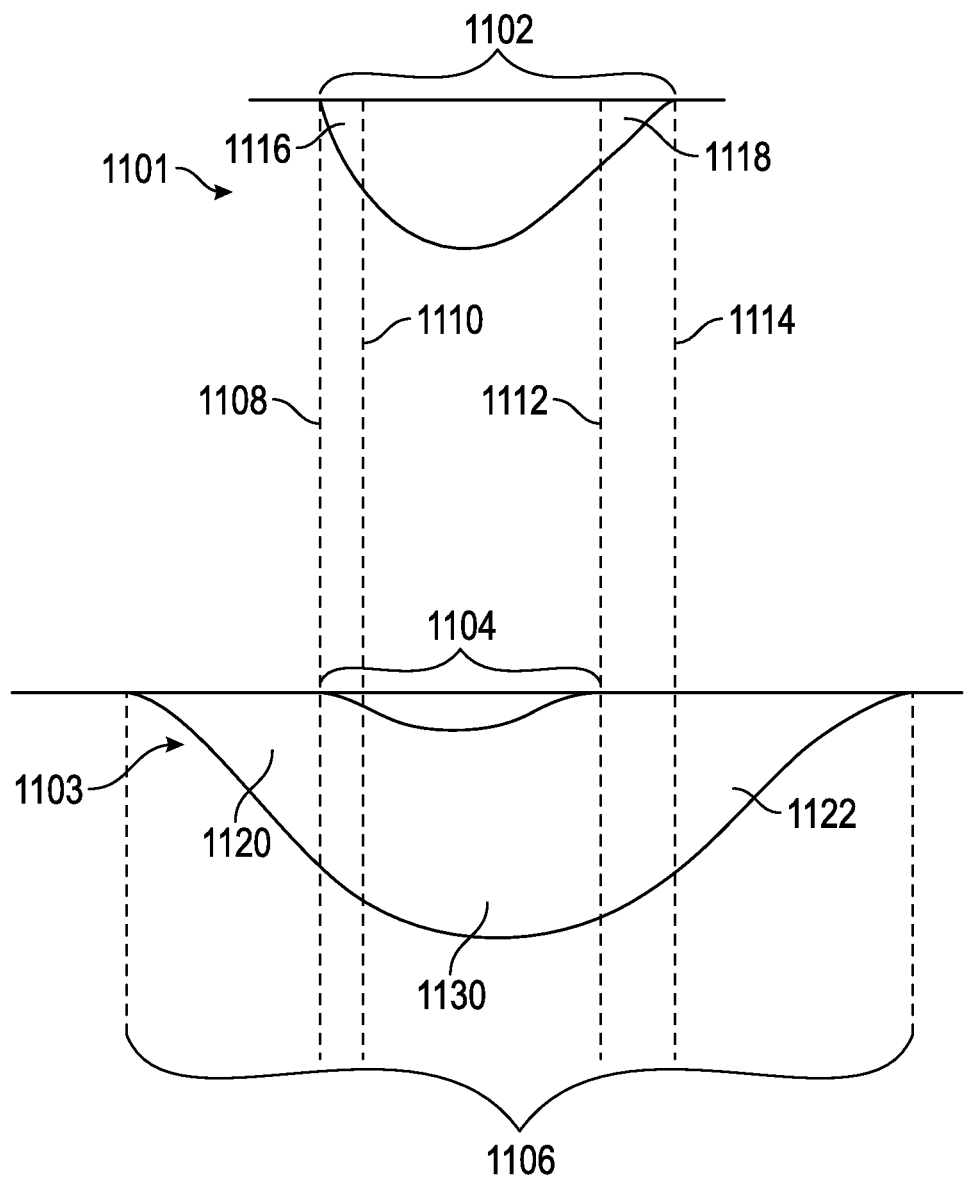
FIG. 11 is a two-dimensional graphic illustration of a first force blob of greater extent than its corresponding touch blob, and a second force blob of lesser extent than its corresponding touch blob in accordance with an embodiment of the invention.

Referring now to FIG. 11, it can be seen that the force segmentation algorithm may yield force blobs which include a greater or lesser number of touch pixels than initially used to seed the corresponding force basin. More particularly, FIG. 11 a two-dimensional graphic illustration of a touch blob 1101 and a corresponding force segmentation graphic 1103 is shown. In the illustrated example, the force segmentation graphic 1103 includes an exemplary first force blob 1104 of lesser extent than the touch blob 1102 (i.e., having a lesser number of total pixels), and an exemplary second force blob 1106 of greater extent than the touch blob 1102.

With continued reference to FIG. 11, a force basin is initially seeded with the pixels comprising the touch blob 1102, which may be graphically represented by a force basin region 1130 between a left border 1108 and a right border 1114; that is, the initially seeded force basin is defined by that portion of the force basin region 1130 between borders 1108 and 1114. In the event the force image segmentation process grows the initially seeded force basin by adding additional force pixels into the force basin (such as pixel ($x_3$, $y_5$) in FIG. 9), the resulting force basin may increase in size as shown by regions 1120 and 1122. Conversely, force image pixels (e.g., regions 1116 and 1118) may removed from the force basin during force image segmentation if, for example, the seeded pixels have a corresponding force value below a threshold, thereby yielding a smaller resulting force blob 1104.

Figure 12:
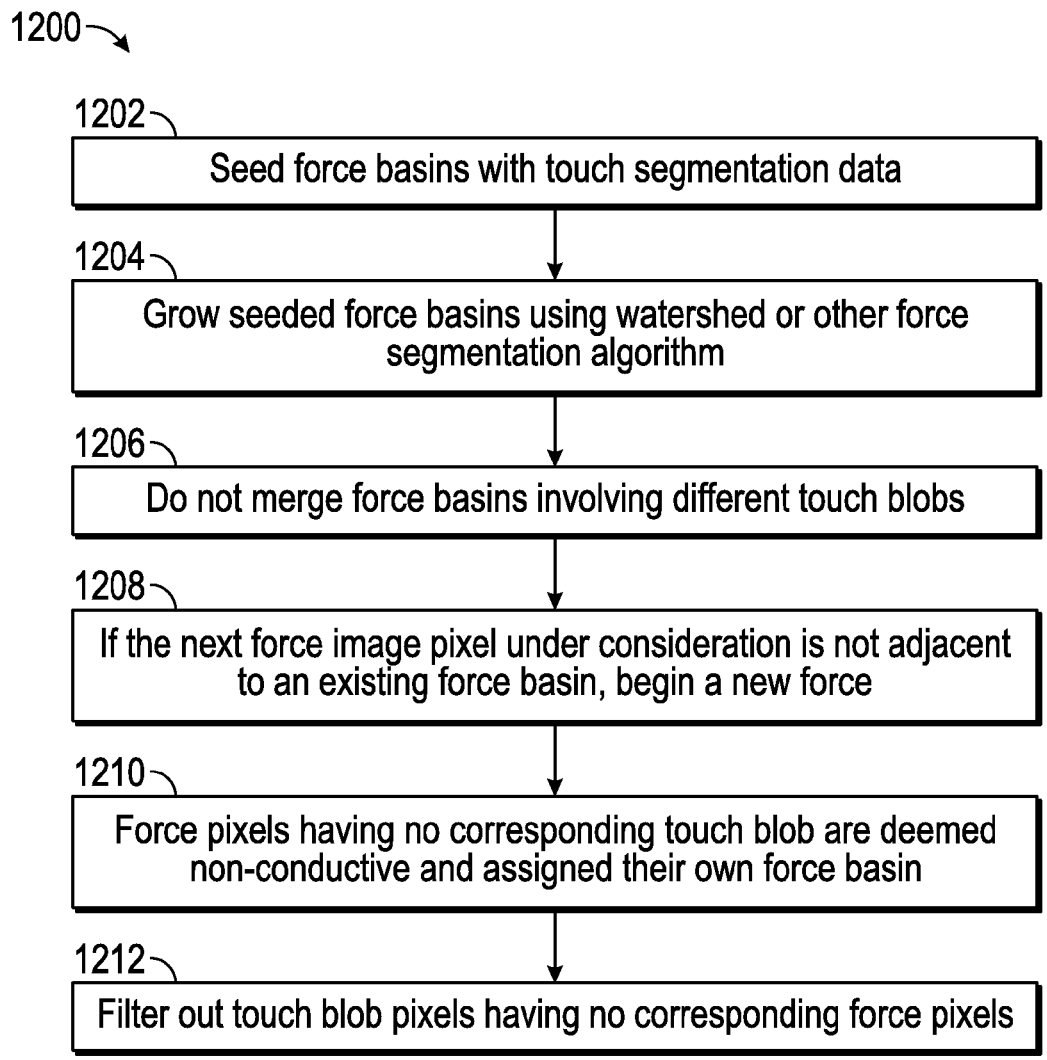
FIG. 12 is a flow diagram of an exemplary force image segmentation process in accordance with an embodiment of the invention.

Although the various embodiments described herein are not limited to any particular force image segmentation process or algorithm, the force segmentation metrics set forth in FIG. 12 may nonetheless provide useful guidance in configuring a force image segmentation algorithm.

More particularly, FIG. 12 is a flow diagram 1200 of an exemplary force segmentation process, where the steps are not necessarily ordered sequentially. The force image segmentation process includes the steps of: i) seeding at least one force basin with information determined from the touch image segmentation stage (Task 1202); ii) grow the seeded force basins with additional force image pixels according to a nominal image segmentation algorithm (Task 1204); iii) merge adjacent force basins according to segmentation algorithm criteria only if the adjacent force basins were not seeded from different touch blobs (Task 1206); iv) if the force pixel under examination is not adjacent to or neighboring an existing force basin, then start a new force basin (Task 1208); v) force pixels having no corresponding touch blob are deemed non-conductive and assigned their own force basin (Task 1210); and vi) touch blob pixels having no corresponding force image pixels above a threshold value (e.g., region 902 of FIG. 9) are filtered out (Task 1212).

Upon completion of the force image segmentation process, i.e., once the force basins are fully grown, the completed force basins are declared force blobs. The total force associated with each force blob may then be computed using any known or hereafter developed technique for summing or otherwise combining the individual force values of the force pixels within a force blob.

A processing system is thus provided for use with an input device of the type including a sensing region overlapping an input surface, and an array of sensor electrodes configured to form a plurality of proximity pixels and a plurality of force pixels. The processing system is communicatively coupled to the array of sensor electrodes, and is configured to: determine a proximity image indicative of positional information for input objects in the sensing region, based on a variable capacitance associated with each of the plurality of proximity pixels; determine a force image indicative of local deflection of the input surface in response to force applied by the input objects, based on a variable capacitance associated with each of the plurality of force pixels; determine a group of proximity pixels from the proximity image corresponding to each input object in the sensing region; determine a group of force pixels from the force image corresponding to each determined group of proximity pixels; determine the force for at least one input object based on the determined groups of force pixels; and determine the position of at least one input object based on the determined groups of proximity pixels.

In an embodiment, the determined groups of force pixels may be based on a planar alignment of the determined groups of proximity pixels relative to corresponding force pixels for each input object; that is, the alignment may be based on a mapping of a respective one of the determined groups of proximity pixels to a corresponding group of force pixels for each input object, wherein the proximity-to-force pixel mapping one-to-one, greater than one-to-one, or less than one-to-one.

In an embodiment, the array of proximity pixels and the array of force pixels may share a common array of two-dimensional coordinate locations, and further wherein determining the group of force pixels comprises seeding the group of force pixels with the coordinate locations of one of the determined groups of proximity pixels.

In an embodiment, determining the group of force pixels from the force image corresponding to each determined group of proximity pixels involves, for each force pixel in the force image above a threshold value, assigning that force pixel to at least one of the determined groups of proximity pixels, wherein the threshold value may be a predetermined value, a dynamically configurable value, or zero.

In an embodiment, determining the group of force pixels further comprises removing seeded force pixels having a value less than the threshold value, and determining the force associated with each input object comprises summing the force values associated with the pixels within each respective group of force pixels.

In an embodiment, the processing system may be further configured to determine the pressure applied to the input surface by each input object based on the groups of proximity pixels and the groups of force pixels.

In an embodiment, the processing system may be further configured to determine the groups of force pixels using an iterative image segmentation algorithm which evaluates the force image on a pixel-by-pixel basis, where the algorithm may be a watershed algorithm.

In an embodiment, the processing system may be further configured to determine the position of a non-conductive input object touching the input surface based on a group of force pixels grown from the segmentation algorithm and for which there is no corresponding group of proximity pixels.

In an embodiment, the processing system may be further configured to control a user interface action based on a determined coordinate position and force associated with at least one input object.

In an embodiment, the processing system may be further configured to: transmit a sensing signal onto a first subset of the plurality of sensor electrodes; receive a first resulting signal from a second subset of the plurality of sensor electrodes; and receive a second resulting signal from a third subset of the plurality of sensor electrodes; wherein the first resulting signal comprises effects of input object presence proximate the input surface, and the second resulting signal comprises effects of input object pressure onto the input surface.

An input device for an electronic system is also provided including: a sensing region overlapping an input surface; a plurality of sensor electrodes configured to form a plurality of proximity pixels and a plurality of force pixels; and a processing system communicatively coupled to the sensor electrodes. The processing system may be configured to: determine a proximity image and a force image indicative of input objects in the sensing region; determine a first group of proximity pixels from the proximity image corresponding to at least a first input object; determine a first group of force pixels, corresponding to the first input object, by: seeding a first preliminary group of force pixels with information from the determined group of proximity pixels; and augmenting the first preliminary group of force pixels with at least one force pixel from the force image which are above a threshold and adjacent to the seeded first preliminary group of force pixels.

In an embodiment, the processing system may be further configured to: determine a second group of proximity pixels from the proximity image corresponding to at least a second input object; determine a second group of force pixels, corresponding to the second input object, by: seeding a second preliminary group of force pixels with information from the determined group of proximity pixels; and augmenting the second preliminary group of force pixels with force pixels from the force image which are above a threshold and adjacent to the seeded second preliminary group of force pixels.

In an embodiment, the processing system is further configured to remove force pixels from the first force basin which have an associated force value less than a threshold value.

In an embodiment, the processing system is further configured to: determine a first position of the first input object based on the first group of proximity pixels; determine a first force associated with the augmented first force basin; and control a user interface action based on the first position and the first force.

In an embodiment, the processing system is further configured to: transmit a sensing signal onto a first electrode of the plurality of sensor electrodes; receive a first resulting signal from a second electrode of the plurality of sensor electrodes; receive a second resulting signal from a third electrode of the plurality of sensor electrodes; determine a variable capacitance associated with at least one proximity pixel based on the first resulting signal; and determine a variable capacitance associated with at least one force pixel based on the second resulting signal.

In an embodiment, the processing system is further configured to determine a variable capacitance associated with each of the plurality of proximity and force pixels by: transmitting a sensing signal onto a first subset of the plurality of sensor electrodes; receiving a first type of resulting signal from a second subset of the plurality of sensor electrodes; and receiving a second type of resulting signal from a third subset of the plurality of sensor electrodes.

In an embodiment, the processing system is further configured to: determine a position of the first input object based on the first determined group of proximity pixels; determine a force of the first input object based on the first determined group of force pixels; and control a user interface action based on the determined position and the determined force of the first input object.

In an embodiment, the processing system is further configured to determine a force associated with the first input object based on force values of the first determined group of force pixels, and determine a force associated with the second input object based on force values of the second determined group of force pixels.

In an embodiment, the plurality of sensor electrodes comprises a first subset, a second subset, and a third subset of sensor electrodes, the first and second subsets correspond to the proximity pixels, and the second and third subsets correspond to the force pixels.

In an embodiment, the processing system is further configured to determine a first force associated with the first input object by summing force values within the first force basin, and determine a second force associated with the second input object by summing force values within the second force basin.

A method is also provided for determining the force applied to a pixelated capacitive input surface by at least one an input object. The method involves: determining a proximity image and a force image for the at least one input object; determining a unique group of proximity pixels for each of the at least one input object from the proximity image; determining a unique group of force pixels for each of the at least one input object based on the unique group of proximity pixels; and determining a force value for the at least one input objects based on the unique groups of force pixels; wherein each force pixel in the force image above a threshold value is assigned to a single unique group of force pixels.

The method may also include controlling a user interface action based on the determined force value of the at least one input object.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for use with an input device having an array of sensor electrodes, the processing system configured to be communicatively coupled to the array of sensor electrodes and configured to:
   operate at least a subset of the array of sensor electrodes to determine a proximity image for input objects in a sensing region of the input device;
   operate at least a subset of the array of sensor electrodes to determine a force image indicative of local deflection of an input surface of the input device;
   determine a first group of proximity pixels from the proximity image corresponding to a first input object in the sensing region to obtain a determined group of proximity pixels;
   determine a first group of force pixels from the force image corresponding to the determined first group of proximity pixels to obtain a determined group of force pixels;
   determine the force for the first input object based on the determined group of force pixels; and
   perform a user interface action based on the force determined for the first input object.

2. The processing system of claim 1, wherein the proximity image is determined from a change in a plurality of variable capacitances formed by the subset of the array of sensor electrodes, wherein each variable capacitance comprises a proximity pixel.

3. The processing system of claim 1, wherein the force image is determined from a change in a plurality of variable capacitances formed by the subset of the array of sensor electrodes, wherein each variable capacitance comprises a force pixel.

4. The processing system of claim 1, further configured to:
   determine the position of the first input object based on the determined group of proximity pixels.

5. The processing system of claim 1, wherein the determined first group of force pixels is based on a planar alignment of the proximity pixels relative to the force pixels for the first input object.

6. The processing system of claim 1, wherein the determined first group of force pixels are based on a mapping of one of the determined group of proximity pixels to a corresponding group of force pixels for the first input object, wherein the proximity-to-force pixel mapping comprises one of: i) a one-to-one; ii) greater than one-to-one; and iii) less than one-to-one.

7. The processing system of claim 1, wherein the array of proximity pixels and the array of force pixels formed by the array of sensor electrode share a common array of two-dimensional coordinate locations.

8. The processing system of claim 7, wherein determining the first group of force pixels comprises seeding the first group of force pixels with the coordinate locations of the proximity pixels in the determined group of proximity pixels to obtain a plurality of seeded force pixels.

9. The processing system of claim 1, wherein determining the first group of force pixels from the force image corresponding to the determined group of proximity pixels comprises:
for each force pixel in the force image above a threshold value, assigning that force pixel to the determined group of proximity pixels.

10. The processing system of claim 8, wherein determining the first group of force pixels further comprises removing seeded force pixels, in the plurality of seeded force pixels, having a value less than a threshold value.

11. The processing system of claim 1, wherein the determined force for the first input object is based on a force value associated with each force pixel of the determined group of force pixels.

12. The processing system of claim 11, further configured to determine pressure applied to the input surface by the first input object based on a contact area of the first input object and the determined force for the first input object.

13. The processing system of claim 9, wherein assigning each force pixel in the force image comprises using an image segmentation algorithm which evaluates the force image based on the determined group of proximity pixels for the first input object.

14. The processing system of claim 1, further configured to:
determine a second group of force pixels from the force image having no corresponding determined group of proximity pixels; and
determine a position of a non-conductive input object contacting the input surface based on the determined second group of force pixels and the absence of the corresponding group of proximity pixels.

15. The processing system of claim 1, wherein performing the user interface action comprises updating a display of the input device.

16. The processing system of claim 1, wherein operating at least the subset of the array of sensor electrodes to determine a proximity image and a force image comprises:
transmitting a sensing signal onto a first electrode of the plurality of sensor electrodes;
receiving a first resulting signal from a second electrode of the plurality of sensor electrodes; and
receiving a second resulting signal from a third electrode of the plurality of sensor electrodes;
determining the change in the variable capacitance associated with at least one proximity pixel based on the first resulting signal; and
determine the change in the variable capacitance associated with at least one force pixel based on the second resulting signal.

17. The processing system of claim 16, wherein the change in the variable capacitance associated with at least one proximity pixel occurs in response to the presence of input objects in the sensing region and the change in the variable capacitance associated with at least one force pixel occurs in response to the local deflection of the input surface.

18. An electronic system having an input device, the input device comprising:
a sensing region overlapping an input surface;
a plurality of sensor electrodes configured to form a plurality of proximity pixels and a plurality of force pixels; and
a processing system configured to be communicatively coupled to the plurality of sensor electrodes and configured to:
determine a proximity image and a force image indicative of at least one input object in the sensing region;
determine a first group of proximity pixels from the proximity image corresponding to a first input object of the at least one input object to obtain a determined first group of proximity pixels; and
determine a first group of force pixels, corresponding to the first input object to obtain a determined first group of force pixels.

19. The electronic system of claim 18, wherein the processing system is configured to determine the first group of three pixels by:
seeding a first preliminary group of force pixels with information from the determined group of proximity pixels; and
augmenting the first preliminary group of force pixels with at least one force pixel from the force image which are above a threshold and adjacent to the seeded first preliminary group of force pixels.

20. The electronic system of claim 18, wherein the processing system is further configured to:
determine a second group of proximity pixels from the proximity image corresponding to a second input object to obtain a determined second group of proximity pixels;
determine a second group of force pixels, corresponding to the second input object, by:
seeding a second preliminary group of force pixels with information from the determined group of proximity pixels; and
augmenting the second preliminary group of force pixels with force pixels from the force image which are above a threshold and adjacent to the seeded second preliminary group of force pixels.

21. The electronic system of claim 18, wherein the processing system is further configured to:
control a user interface action based on the determined position and the determined force of the first input object by updating a display of the electronic system.

22. The input device of claim 21, wherein the input surface overlaps the display.

* * * * *

UNITED STATES PATENT AND TRADEMARK OFFICE
CERTIFICATE OF CORRECTION

PATENT NO. : 9,690,438 B2  
APPLICATION NO. : 15/149080  
DATED : June 27, 2017  
INVENTOR(S) : Patrick Worfolk et al.

Page 1 of 1

It is certified that error appears in the above-identified patent and that said Letters Patent is hereby corrected as shown below:

In the Claims

At Column 18, Claim number 19, Line 25, the word "three" should read -- force --.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*